May 28, 1935.  A. URFER  2,002,874
ALTIMETER
Filed April 6, 1932  3 Sheets-Sheet 1
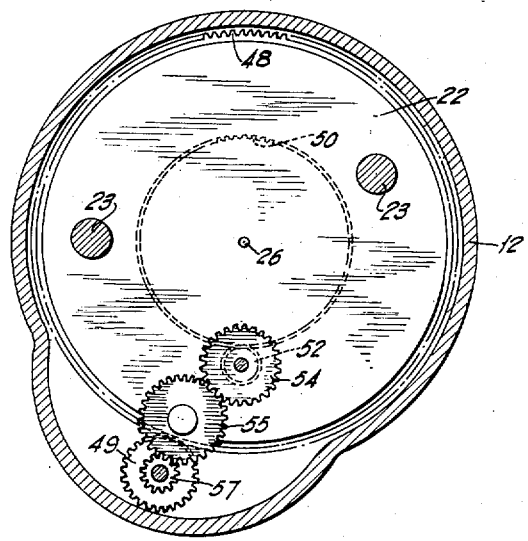
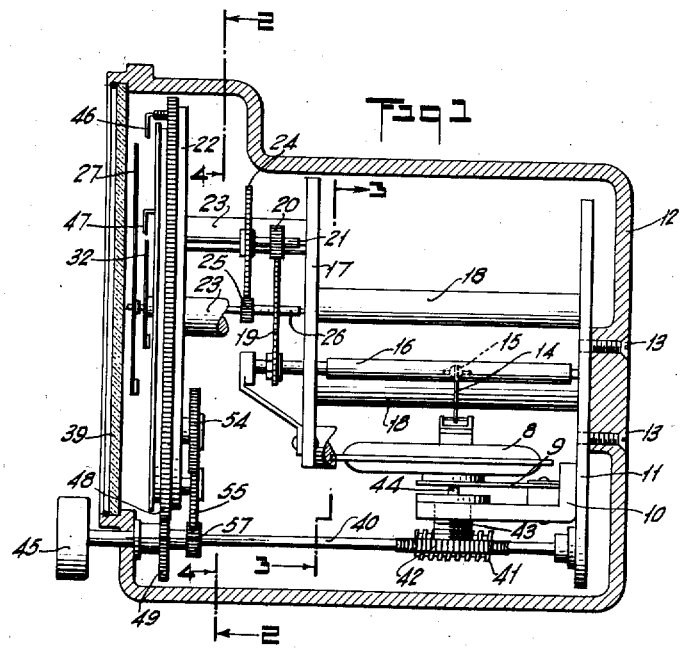
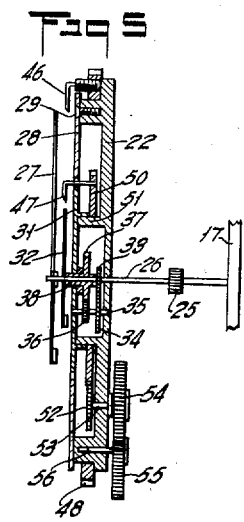
INVENTOR.
ADOLF URFER
BY Stephen Cerstvik
ATTORNEY.

May 28, 1935.  A. URFER  2,002,874
ALTIMETER
Filed April 6, 1932   3 Sheets-Sheet 2
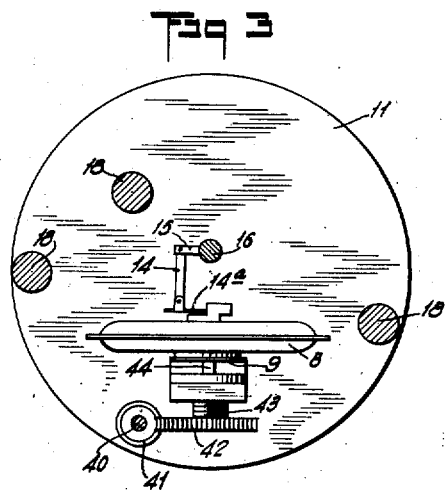
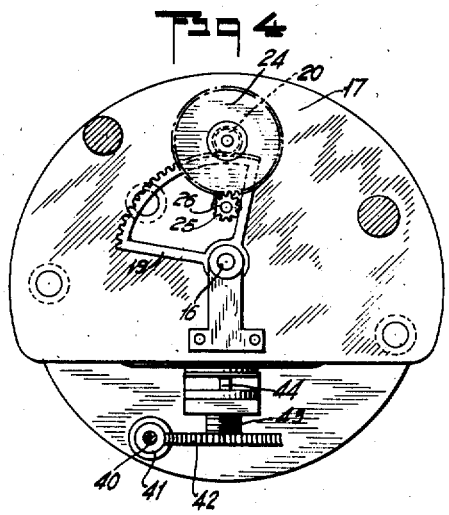
INVENTOR.
ADOLF URFER.
BY Stephen Gerstvik
ATTORNEY.

May 28, 1935.  A. URFER  2,002,874
ALTIMETER
Filed April 6, 1932  3 Sheets-Sheet 3

INVENTOR.
ADOLF URFER.
BY Stephen Cerstvik
ATTORNEY.

Patented May 28, 1935

2,002,874

UNITED STATES PATENT OFFICE 2,002,874

ALTIMETER

Adolf Urfer, Richmond Hill, N. Y., assignor to Bendix Aviation Corporation, South Bend, Ind., a corporation of Delaware Application April 6, 1932, Serial No. 603,650

10 Claims. (Cl. 73—4)

The present invention relates to indicating instruments, and more particularly to sensitive instruments for indicating the altitude of an aircraft.

One of the objects of the present invention is to provide a novel altimeter which may be particularly adapted for use on aircraft.

Another object of the invention is to provide a novel altimeter of the type wherein adjustment to a predetermined condition may be readily made so that the instrument will give a predetermined indication when such condition occurs.

Still another object is to provide, in a sensitive altimeter, a novel construction permitting relative movement between the pointers and scale when initially adjusting the altimeter so that the same will produce a desired indication when a predetermined altitude is reached, and which also permits a ready indication of such predetermined altitude when such adjustment is made.

A further object is to provide, in a sensitive altimeter of the above type, an unusually efficient construction of the type which embodies relatively few parts, whereby the instrument may be manufactured economically on a production basis.

The above and other objects will appear more fully hereinafter from the following detailed description when taken in connection with the accompanying drawings. It is to be expressly understood, however, that the drawings are for purposes of illustration only and are not designed as a definition of the limits of the invention, reference being had for this purpose to the appended claims.

In the drawings, wherein similar reference characters denote similar parts through the several views:

Fig. 1 is a longitudinal sectional view of an altimeter construction in accordance with the present invention;

Fig. 2 is a transverse sectional view taken on line 2—2 of Fig. 1;

Fig. 3 is a transverse sectional view taken on line 3—3 of Fig. 1;

Fig. 4 is a transverse sectional view taken on line 4—4 of Fig. 1;

Fig. 5 is a detail view in section of a portion of the mechanism for actuating the pointers and reference means;

Figure 6:
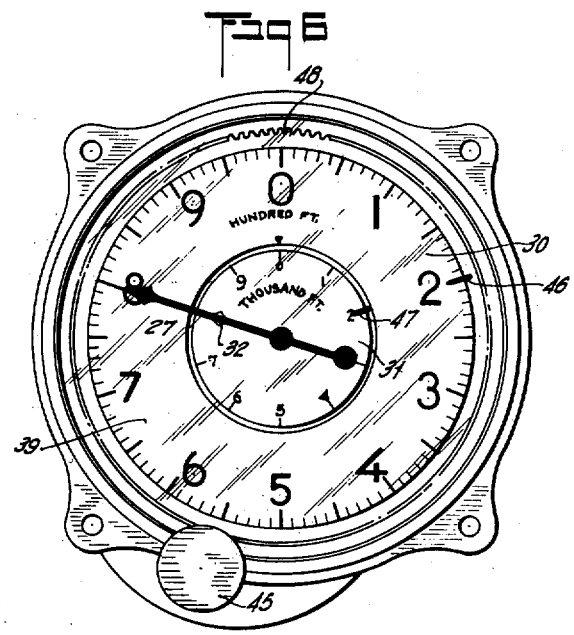
Figure 7:
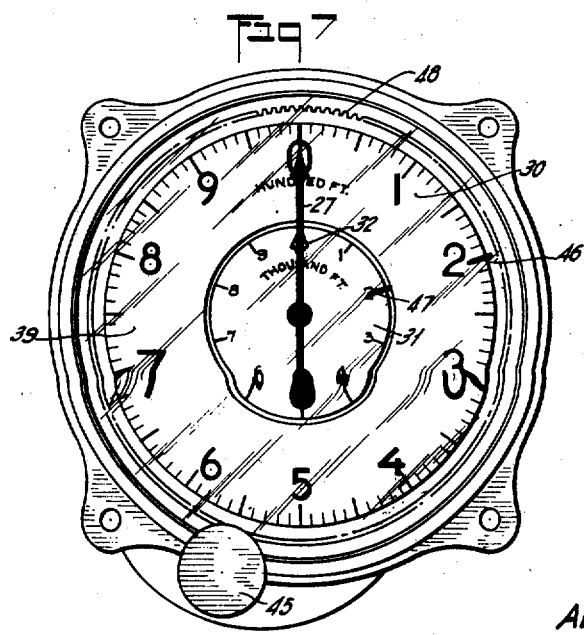

Fig. 6 is a front view of the altimeter illustrating the position of the pointers and reference means after an initial adjustment of twenty-two hundred (2200) feet has been made; and Fig. 7 is a view similar to Fig. 6 illustrating the condition of the pointers after the altimeter has been actuated in accordance with the atmospheric pressure existing at an altitude of twenty-two hundred (2200) feet.

Referring to the drawings, and more particularly to Figs. 1 to 4, an instrument embodying the present invention is illustrated herein in the form of an altimeter having an evacuated pressure sensitive element which is adapted to expand and contract upon variations of pressure due to changes in altitude. The instrument also includes an amplification mechanism for amplifying the relatively small movements of the pressure sensitive element into readily discernible movements of a plurality of pointers cooperating with suitable scales to indicate the altitude in feet, meters, or in any suitable terms of barometric pressure, as desired, the pointers being preferably geared together in such a manner that one moves only a fraction of a revolution for one complete revolution of the other, the latter indicating the altitude in hundreds of feet, for example, and the former in thousands of feet.

As illustrated, the pressure sensitive element comprises an aneroid capsule 8 carried by resilient arm 9 which at one end is rigidly secured to a bracket 10 carried by a plate 11, the said plate being attached to a housing or casing 12 by any suitable means such as screws 13. Means are provided for utilizing and amplifying the movement of the aneroid capsule upon expansion or contraction thereof in response to changes in atmospheric pressure, in order to produce suitable indications of such changes, which indications may be in terms of barometric pressure or altitude in feet or meters as heretofore mentioned. As shown, such means includes a pair of pivotally connected links 14 and 15, Fig. 3, the link 14 being connected to the aneroid capsule 8 through a temperature compensating elements 14a, while the link 15 is secured to a rock shaft 16, one end of which is journaled in the plate 11, while the other end is suitably journaled in a supporting plate 17 secured to and supported by plate 11 through spacing rods 18.

In order to multiply the motion of the rock shaft 16, the latter carries a gear sector 19, which is arranged to mesh with a pinion 20, the latter being carried by a counter-shaft 21 journaled in the plate 17 and in another supporting plate 22 connected to the plate 17 as by means of spacing rods 23. Secured to the shaft 21 is a relatively large gear 24 which meshes with a pinion 25 secured to a shaft 26, which latter extends through plate 22, Fig. 5, and has secured thereto a large pointer 27. The latter cooperates with a suitable dial or scale 28 which is stationarily mounted upon the plate 22 as by means of screws 29, the said dial being suitably marked with the scale 30, Figs. 6 and 7, graduated in hundreds of feet, for example. Concentrically disposed with respect to the scale 30 is a second scale 31 which is preferably graduated in thousands of feet and has cooperating therewith a small pointer 32.

In order that the pointer 32 is moved with respect to its scale 31, and with the pointer 27 in the ratio existing between scales 30 and 31, the pointers are geared together in such a manner that the pointer 32 moves only a fraction of a revolution for one complete revolution of pointer 27, and for this purpose another gear 33 is secured to the shaft 26 and arranged to mesh with a relatively large gear 34 mounted upon a countershaft 35. This last named shaft also carries a pinion 36 adapted to mesh with and rotate a gear 37 which is secured to a sleeve 38 surrounding shaft 26 but rotatable with respect thereto. The pointer 32 is secured to the outer extremity of sleeve 28 which projects through the scale 31 as will be apparent from Fig. 5. In order to protect the mechanism from dust, etc., a cover 39 of some suitable transparent material is secured at the open end of the casing 12 in any suitable manner.

It will be apparent from the foregoing that, as the aneroid capsule is actuated by atmospheric pressure, the rock shaft 16 will be moved through links 14 and 15 to effect movement of the gear sector 19, and thereby operating the pointer 27 and 32 in the proper ratio through the gear trains 20, 24, 25 and 33, 34, 36, 37, respectively. It will also be apparent that the pointers 27 and 32 will indicate the altitude with respect to barometric pressure at sea level and not the true altitude with respect to the ground; that is, the pointers would indicate zero only when the instrument is at sea level under normal conditions.

It may be highly desirable, under certain conditions, to render the instrument capable of adjustment under one condition for a second condition and to indicate when such second condition occurs. To this end, means are provided for making such an adjustment to effect an initial setting of the instrument, and such means are preferably so constituted as to cause a relative movement between the pointers and the respective scales in such a manner that the pointers will indicate zero when the instrument reaches the altitude for which it was set. In the form shown, such means comprises an adjusting or actuating shaft 40 having a worm 41 secured thereto and adapted to actuate the worm gear 42 rigidly attached to a rod 43 threadedly received by the bracket 10. As shown, the rod 43 extends through an arm of said bracket and is provided with a reduced portion 44 abutting the resilient arm 9, the latter being so constructed as to always be maintained in firm engagement with the portion 44. The shaft 40 is suitably journaled in the casing 12 and in the plate 11 and is preferably provided with an actuating knob 45 exteriorly of the casing and adjacent the front of the instrument. It will be readily apparent from the above that, when it is desired to adjust the instrument to impart thereto an initial setting, it is only necessary to manually rotate shaft 40, whereupon worm 41 will effect rotation of worm gear 42 to rotate rod 43 secured thereto. Since the rod 43 is threadedly received by the stationary bracket 10, the former will be moved downwardly, for example, as viewed in Fig. 1, and the resiliency of arm 9 will cause the end thereof to follow the movement of the portion 44. Since the aneroid capsule 8 is fixedly secured to the arm 9, the former will be bodily moved, such movement effecting a relative movement between the amplification mechanism interposed between the aneroid capsule and the pointer 27 to impart a counterclockwise movement of said pointer with respect to its scale 30 as viewed in Fig. 6. Relative movement between the gears constituting the gear train, interconnecting shaft 26 and pointer 32, will also be effected to cause the latter to be moved in a predetermined ratio with respect to its associated scale 31.

It is highly desirable, when initially setting the instrument, as above described, to positively indicate upon the scales, at the time the setting is made, the amount of the setting, so that such indication may serve as a reference point. In other words, if it is desired to set the pointers so that they will indicate zero when a certain altitude is reached, it is essential that such condition be indicated at the time the setting is being made. To this end, means are provided whereby the indication of the desired condition for which the instrument is set is produced simultaneously with the bodily movement of the aneroid capsule to cause relative movement between the pointers and their scales. In the form of invention illustrated, such means includes movable reference means comprising indices or marks 46 and 47 associated with the scales 30 and 31, respectively, Figs. 6 and 7. The reference mark 46 is carried by a relatively large gear 48 adapted to be actuated by pinion 49 secured to shaft 40, the ratio and arrangement of the gearing 48 and 49 being such that, upon initial setting of the instrument, the extent of movement of the reference mark 46 will be identical with the extent of movement of the large pointer 27 but such movements will be indicated in opposite directions with respect to the scale 30. The reference mark 47 is likewise moved in a direction opposite to the movement of the small pointer 32, these movements being of equal extent during setting. The means for effecting such movement of the small pointer includes a gear 50 supporting the reference mark 47, and rotatably mounted on a boss 51 of the plate 22, the said gear meshing with a gear 52 carried by one end of a counter-shaft 53, the other end of which rigidly supports a gear 54. The latter meshes with a gear 55 mounted to rotate upon a stub shaft 56, the gear 55 being adapted to be actuated by a pinion 57 secured to the actuating shaft 40.

It will readily be appreciated from the foregoing that when the knob 45 is actuated to adjust the instrument for a desired condition, relative movement is caused between the pointers and their respective scales through their respective gear trains and through the amplification mechanism by the bodily movement of the aneroid capsule 8 through the worm 41, worm gear 42 and threaded member 43. Simultaneously with the bodily movement of the aneroid capsule, the counter-shaft 40 also actuates the reference means 46 and 47 to positively indicate the condition for which the instrument has been set. Referring to Fig. 6, it will be appreciated that the pointers and reference marks are moved in opposite directions and that the reference marks give a partial indication of the initial setting of the instrument. After such initial setting, the aneroid capsule will expand and contract in the usual manner in accordance with changes in atmospheric pressure, to effect normal indicating action of the pointers 27 and 31, it being appreciated that the worm and worm gear arrangement, 41, 42, is of a self-locking character and prevents any movements of the aneroid capsule from being transmitted to the shaft 40.

There is thus provided by the present invention a novel indicating device which may be set under one condition for a second condition so that it will indicate when the second condition occurs or is reached and also indicates the condition for which it has been set independently of the indicating action of the device. As was hereinbefore pointed out, the construction and arrangement of the parts are such that, during setting of the instrument, the pointers will be moved in opposite directions with respect to the reference means so that the latter, associated with the scales, give a positive indication of the initial adjustment of the instrument. The provision of the mechanism, whereby the aneroid capsule is bodily moved during setting of the device, provides a relatively simple and compact construction involving relatively few parts, and it is to be noted that once the mechanism has been set, the normal movement of the aneroid capsule will not be transmitted to the reference means by reason of the nature of the connection between these parts.

Although only one embodiment of the invention has been illustrated and described, it will be readily understood by those skilled in the art that changes may be made therein without departing from the spirit of the invention. Reference will, therefore, be had to the appended claims for a definition of the limits of the invention.

What is claimed is:

1. An altimeter comprising a pressure sensitive element, a plurality of pointers operable at different speeds, scales for said pointers, a plurality of intermeshed gears interconnecting said pointers, amplifying means connected between said gears and element, a reference mark associated with each of said scales and moving with said pointers in opposite directions with respect to said scales during setting, and means for bodily moving said element along its operating axis to effect relative movement between said gears through said amplifying means for simultaneously moving the pointers and reference marks in opposite directions with respect to the scales in setting the altimeter.

2. A sensitive altimeter comprising a housing, a pressure sensitive element mounted in the housing, a stationary scale secured within the housing, a pointer associated with the scale, a plurality of intermeshed gears connected to said pointer, amplifying means connected between said gears and element for actuating said pointer upon operation of said element, a reference mark associated with the scale, and common means for simultaneously moving said reference mark and bodily moving said element along its operating axis for setting the altimeter, movement of said element effecting relative movement between said gears and rotation of said pointer in a direction opposite to that of the reference mark in respect to the scale.

3. An indicating device including means having indicia thereon, movable pointer means, an actuator responsive to changes in conditions or operations for operating said pointer means to indicate such changes, reference means associated with said indicia and simultaneously movable in an opposite direction with respect to said pointer means along said indicia during setting for indicating a desired condition when such a predetermined relation is established between the pointer means and said indicia that the pointer means produce a desired indication for the condition indicated by said reference means when the condition occurs, and means for simultaneously moving the reference and pointer means for setting the same and including means operated from the front of the instrument for bodily moving said actuator along its operating axis.

4. An indicating device including circular scale means, a plurality of pointers cooperating with said scale means, one of said pointers making one revolution for a fraction of a revolution of the other pointer, reference means associated with said pointers and scale means, means for moving the pointers and the reference means in predetermined functional ratio for initial setting of the device, and actuating means for operating the pointers independently of said reference means for indicating movement with respect to said scale means from the set position, said actuating means being connected to the means for moving the pointers, and means for moving said actuating means substantially along its actuating axis with said pointers in setting the device.

5. An indicating device including a bodily movable actuator, a relative stationary scale, a pointer operated by the actuator, reference means movable and coordinated with the pointer and directly associated with the scale for setting to indicate a predetermined condition when a certain relation has been established between the pointer and scale, an adjusting means for bodily moving the actuator, the pointer and the reference means to establish the desired relation between the pointer and scale and to indicate the predetermined condition, said adjusting means including a manually operable element in proximity to the front of the device, and said actuator having means operated by said element for bodily moving said actuator along its operating axis during setting.

6. An indicating device including an actuator, a pointer movable by the actuator, a scale for the pointer, a reference means associated with the scale and arranged to be set for indicating a predetermined condition with respect to said scale, means for moving the actuator bodily along its operating axis for setting, and means interconnecting the actuator with the pointer and reference means to cause the latter and pointer to move with respect to the actuator and in opposite directions with respect to the scale.

7. An indicating device including an actuator responsive to changes in conditions or operations, relatively stationary circular scale means having indicia thereon, pointers cooperating with said scale means and drivably connected to said actuator for operation thereby, reference marks associated with said indicia and simultaneously movable in an opposite direction with respect to said pointers along said indicia during setting for indicating the preset condition, and means for simultaneously moving the reference marks and pointers in opposite directions and comprising a movable support carrying the actuator, a gear mechanism associated with said support, means for operating said gear mechanism from the front of the instrument, and means for moving said movable support for bodily movement of said actuator along its operating axis upon operation of said gear mechanism.

8. An indicating device including an actuator responsive to changes in conditions or operations, relatively stationary circular scale means having indicia thereon, pointers cooperating with said scale means and drivably connected to said actuator for operation thereby, reference marks associated with said indicia and simultaneously movable in an opposite direction with respect to said pointers along said indicia during setting for indicating the preset condition, and means for simultaneously moving the reference marks and pointers in opposite directions and comprising a movable support carrying the actuator, a worm gear associated with said support, a worm drivably connected to said gear, a knob for operating said worm from the front of the instrument, and means for moving said movable support for bodily movement of said actuator along its operating axis upon operation of said worm and worm gear.

9. An altimeter including a pressure responsive element, a relatively stationary circular scale having indicia thereon, pointers cooperating with said scale and drivably connected to said pressure responsive element for operation thereby, reference marks associated with said indicia and simultaneously movable in an opposite direction with respect to said pointers along said indicia during setting for indicating the preset condition, and means for simultaneously moving the reference marks and pointers in opposite directions and comprising a movable support carrying the pressure responsive element, a gear mechanism associated with said support, means for operating said gear mechanism from the front of the instrument, and means for moving said movable support for bodily movement of said pressure responsive element along its operating axis upon operation of said gear mechanism.

10. An altimeter including a pressure responsive element, a relatively stationary circular scale having indicia thereon, pointers cooperating with said scale and drivably connected to said pressure responsive element for operation thereby, reference marks associated with said indicia and simultaneously movable in an opposite direction with respect to said pointers along said indicia during setting for indicating the preset condition, and means for simultaneously moving the reference marks and pointers in opposite directions and comprising a movable support carrying the pressure responsive element, a worm gear associated with said support, a worm drivably connected to said gear, a knob for operating said worm from the front of the instrument, and means for moving said movable support for bodily movement of said pressure responsive element along its operating axis upon operation of said worm and worm gear.

ADOLF URFER.